(12) United States Patent
Choi et al.

(10) Patent No.: US 9,832,815 B2
(45) Date of Patent: Nov. 28, 2017

(54) METHOD AND SYSTEM FOR MANAGING COMMUNICATION IN WIRELESS COMMUNICATION NETWORK

(75) Inventors: Jongsoo Choi, Middlesex (GB); Satish Nanjunda Swamy Jamadagni, Byrasandra (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 725 days.

(21) Appl. No.: 13/121,025

(22) PCT Filed: Sep. 23, 2009

(86) PCT No.: PCT/KR2009/005419
§ 371 (c)(1),
(2), (4) Date: Mar. 25, 2011

(87) PCT Pub. No.: WO2010/036020
PCT Pub. Date: Apr. 1, 2010

(65) Prior Publication Data
US 2011/0176522 A1  Jul. 21, 2011

(30) Foreign Application Priority Data

Sep. 25, 2008  (IN) .......................... 2356/CHE/2008

(51) Int. Cl.
| | |
|---|---|
| *H04J 3/00* | (2006.01) |
| *H04W 99/00* | (2009.01) |
| *H04W 72/04* | (2009.01) |
| *H04W 56/00* | (2009.01) |
| *H04W 72/08* | (2009.01) |
| *H04W 76/02* | (2009.01) |

(Continued)

(52) U.S. Cl.
CPC ......... *H04W 99/00* (2013.01); *H04W 56/003* (2013.01); *H04W 56/0045* (2013.01);

(Continued)

(58) Field of Classification Search
CPC ............. H04W 72/0446; H04W 72/04; H04W 28/0236; H04W 72/042; H04W 72/005;

(Continued)

(56) References Cited

U.S. PATENT DOCUMENTS 7,248,571 B1   7/2007  Ilas et al.
8,290,077 B1 * 10/2012  Ben-Eli et al. ............... 375/261

(Continued)

FOREIGN PATENT DOCUMENTS

WO   WO 2009036389 A2 *  3/2009

OTHER PUBLICATIONS

3GPP TSG-GERAN #36, GP-071738, "Speech capacity enhancements using DARP", Nov. 12-16, 2007, Vancouver, Canada.

(Continued)

*Primary Examiner* — Melanie Jagannathan
*Assistant Examiner* — Najeebuddin Ansari
(74) *Attorney, Agent, or Firm* — Jefferson IP Law, LLP

(57) ABSTRACT

A method and system for managing communication in a Multi-User Reusing One time Slot (MUROS) based communication network is provided. The method includes selecting a first communication device from a plurality of communication devices in the communication network, determining a Timing Advance (TA) associated with the first communication device and identifying a type of the first communication device, identifying a second communication device from the plurality of communication devices based on a TA associated with the second communication device, a type of the second communication device, the TA of the first communication device, and the type of the first communication device, and pairing the first communication device and the second communication device in a first time slot for establishing communication with the plurality of communication devices.

9 Claims, 3 Drawing Sheets

(52) U.S. Cl.
CPC ..... *H04W 72/0446* (2013.01); *H04W 72/082* (2013.01); *H04W 76/02* (2013.01)

(58) Field of Classification Search
CPC ............. H04W 72/082; H04W 52/241; H04W 52/325; H04W 28/048; H04W 52/16; H04W 52/247; H04W 72/0406; H04W 72/085; H04W 76/02; H04L 5/0048; H04L 5/0073
USPC ......................................................... 370/336
See application file for complete search history.

(56) References Cited

U.S. PATENT DOCUMENTS

| | | | |
|---|---|---|---|
| 2005/0041605 A1* | 2/2005 | Benson ........................ | 370/280 |
| 2005/0053099 A1* | 3/2005 | Spear et al. ................. | 370/508 |
| 2007/0211620 A1* | 9/2007 | McBeath et al. ............. | 370/209 |
| 2009/0122782 A1* | 5/2009 | Horn et al. ................... | 370/350 |
| 2009/0201880 A1* | 8/2009 | Aghili et al. ................. | 370/331 |
| 2009/0323588 A1* | 12/2009 | Aghili et al. ................. | 370/328 |
| 2010/0067440 A1* | 3/2010 | Dick ..................... | H04L 5/0053 370/328 |
| 2011/0077017 A1* | 3/2011 | Yu et al. .................... | 455/452.1 |
| 2011/0267968 A1* | 11/2011 | Yu et al. ....................... | 370/252 |
| 2013/0107749 A1* | 5/2013 | Yu et al. ....................... | 370/252 |
| 2014/0010208 A1* | 1/2014 | Yu et al. ....................... | 370/336 |

OTHER PUBLICATIONS

3GPP TSG-GERAN #36, GP-072033, "Multi-User Reusing-One-Slot", Nov. 12-16, 2007, Vancouver, Canada.

* cited by examiner

METHOD AND SYSTEM FOR MANAGING COMMUNICATION IN WIRELESS COMMUNICATION NETWORK

PRIORITY

This application is a National Stage application under 35 U.S.C. §371 of an International application filed on Sep. 23, 2009 and assigned application No. PCT/KR2009/005419, and claims the benefit under 35 U.S.C. §365(b) of an Indian patent application filed on Sep. 25, 2008 in the Indian Intellectual Property Office and assigned Serial No. 2356/CHE/2008, the entire disclosure of which is hereby incorporated by reference.

BACKGROUND OF THE INVENTION

1. Field of the Invention

The present invention relates to managing communications in a communication network. More particularly, the present invention relates to managing communications in a Multi-User Reusing One time Slot (MUROS) based communication network.

2. Description of the Related Art

Communication devices such as mobile phones, Personal Digital Assistants (PDAs), laptops, and computers are frequently used for communication. The communication devices can communicate with each other through a communication network. The communication network can be a wired communication network or a wireless communication network. An example of a wired communication network is the Public Switched Telephone Network (PSTN).

In the wireless communication network, a communication range is divided into a plurality of regions called radio cells. Each radio cell has a base station. A base station includes a radio transmitter and receiver used for transmitting and receiving voice and data signals to and from communication devices in a cell. A communication device can communicate with other communication devices in the wireless communication network through one or more base stations. Examples of wireless communication networks include but are not limited to a Global System for Mobile communications (GSM) network, and a Code Division Multiple Access (CDMA) network.

Different communication networks use different communication technique for enabling communication between communication devices. The GSM communication network uses Time Division Multiple Access (TDMA) technology for providing communication to a plurality of communication devices. TDMA is a channel access method for radio networks. The method allows one or more users of the communication devices to use predefined timeslots on specified frequencies in a cell.

The TDMA technology allows a predefined number of users to communicate with other users of communication devices at the same time. Each of the predefined number of users is assigned a time slot for transmitting data in rapid succession, one after the other. However, as the number of slots that can be allocated to users in a cell is fixed, there are various methods that are used to increase the number of users.

One method is applying the Multiple Users Reusing One Single time slot (MUROS) concept. The MUROS concept enhances the cell capacity by pairing two or more users to a single timeslot. However, the quality of communication decreases and sudden degradation in the link quality may be experienced, when the communication channel is established and the pairing of two users is performed using MUROS concept. This is due to the Co-Channel Interference and the power imbalance ratio between the two or more users in the single time slot. In order to mitigate this problem, care should be taken that the Co-Channel Interference should be within the acceptable threshold value. A proper criterion for user pairing or allocation mechanism is required to assign multiple users to a single timeslot.

Accordingly, there exists a need to manage communication links when the wireless communication network uses the MUROS concept for establishing communication channel.

SUMMARY OF THE INVENTION

Aspects of the present invention are to address at least the above-mentioned problems and/or disadvantages and to provide at least the advantages described below. Accordingly, an aspect of the present invention is to provide an apparatus and method for managing communication links when a wireless communication network uses Multiple Users Reusing One Single time slot (MUROS) concept for establishing communication channel.

According to an aspect of the present invention, a method for managing communication at a base transceiver station in a MUROS based communication network is provided. The method includes selecting a first communication device from a plurality of communication devices in the communication network, determining a Timing Advance (TA) associated with the first communication device, identifying a type of the first communication device, wherein the type of the first communication device is associated with receiving capabilities of the first communication device, identifying a second communication device from the plurality of communication devices based on a TA associated with the second communication device, type of the second communication device, the TA of the first communication device and the type of the first communication device, wherein the type of the second communication device is associated with receiving capabilities of the second communication device, and pairing the first communication device and the second communication device in a first time slot for establishing communication with the plurality of communication devices According to another aspect of the present invention, a base transceiver station is provided. The base station includes a processor for selecting a first communication device from a plurality of communication devices in the communication network, for determining a TA associated with the first communication device, for identifying a type of the first communication device, for identifying a second communication device from the plurality of communication devices based on a TA associated with the second communication device, a type of the second communication device, the TA of the first communication device and the type of the first communication device, and for pairing the first communication device and the second communication device in a first time slot for establishing communication, and a memory for maintaining a table that includes information about TAs of the plurality of communication devices.

The features and advantages of the present invention will become more apparent from the ensuing detailed description of the invention taken in conjunction with the accompanying drawings.

Before undertaking the detailed description set forth below, it may be advantageous to set forth definitions of certain words and phrases used throughout this description: the terms 'include' and 'comprise', as well as derivatives thereof, mean inclusion without limitation, the term 'or', is inclusive, meaning and/or, the phrases 'associated with' and 'associated therewith', as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this description, those of ordinary skill in the art should understand that in many, if not most instances, such definitions apply to prior, as well as future uses of such defined words and phrases.

Various embodiments of the present invention described above provide the following advantages. Aspects of the present invention provide a method for managing communication in a MUROS based communication network. The method provides voice quality enhancements in MUROS based communication networks. The method also provides less co-channel interference during communication. The method provides a better bit error rate. The method also reduces extra complexity in identifying communication devices that can be parried for communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages, of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
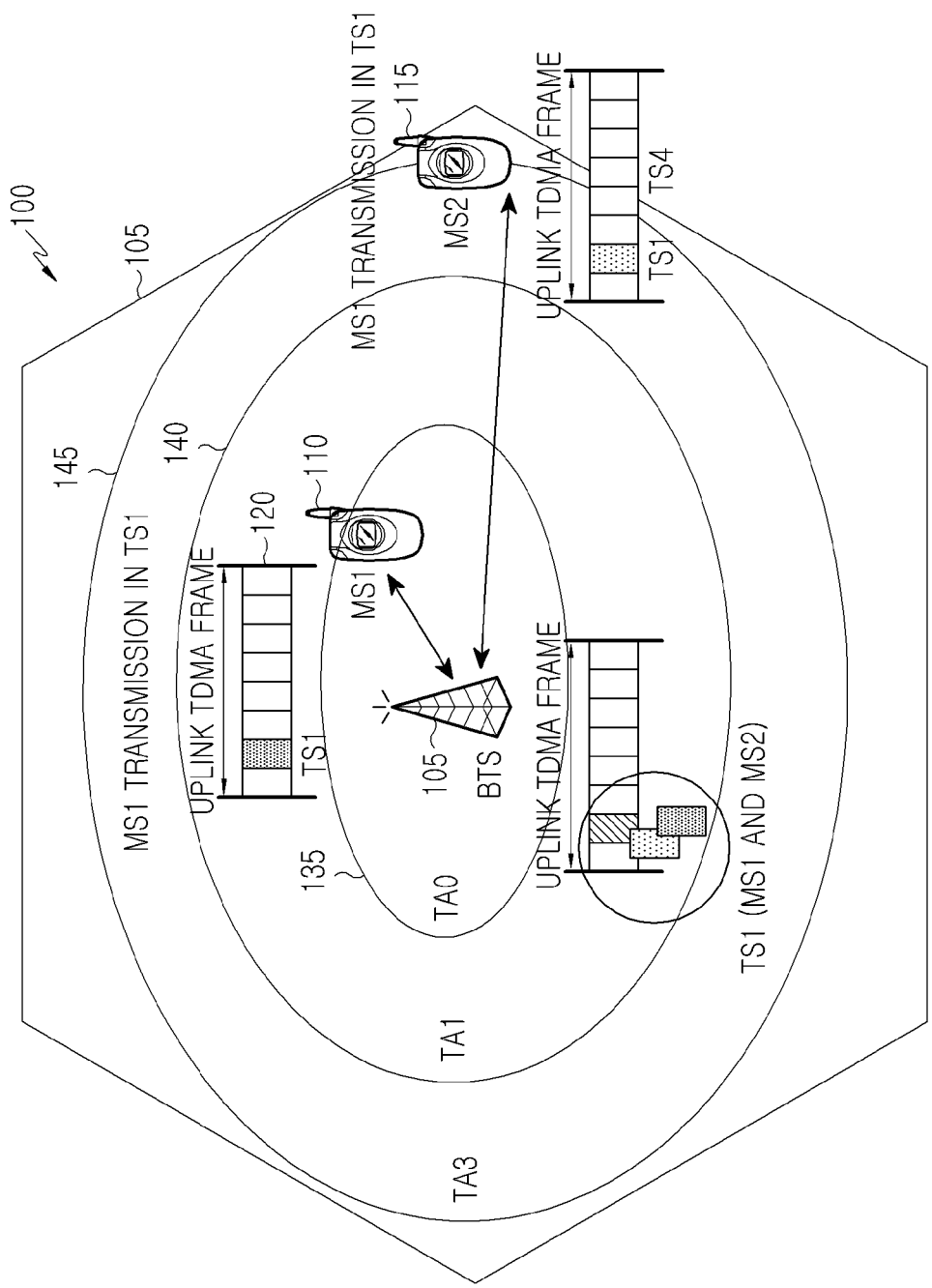
FIG. 1 illustrates an exemplary environment in accordance with an exemplary embodiment of the present invention.
Figure 2:
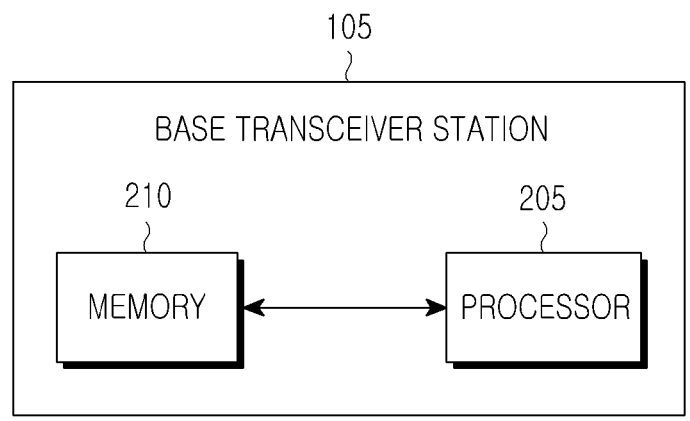
FIG. 2 illustrates a base transceiver station, in accordance with an exemplary embodiment of the present invention.
Figure 3:
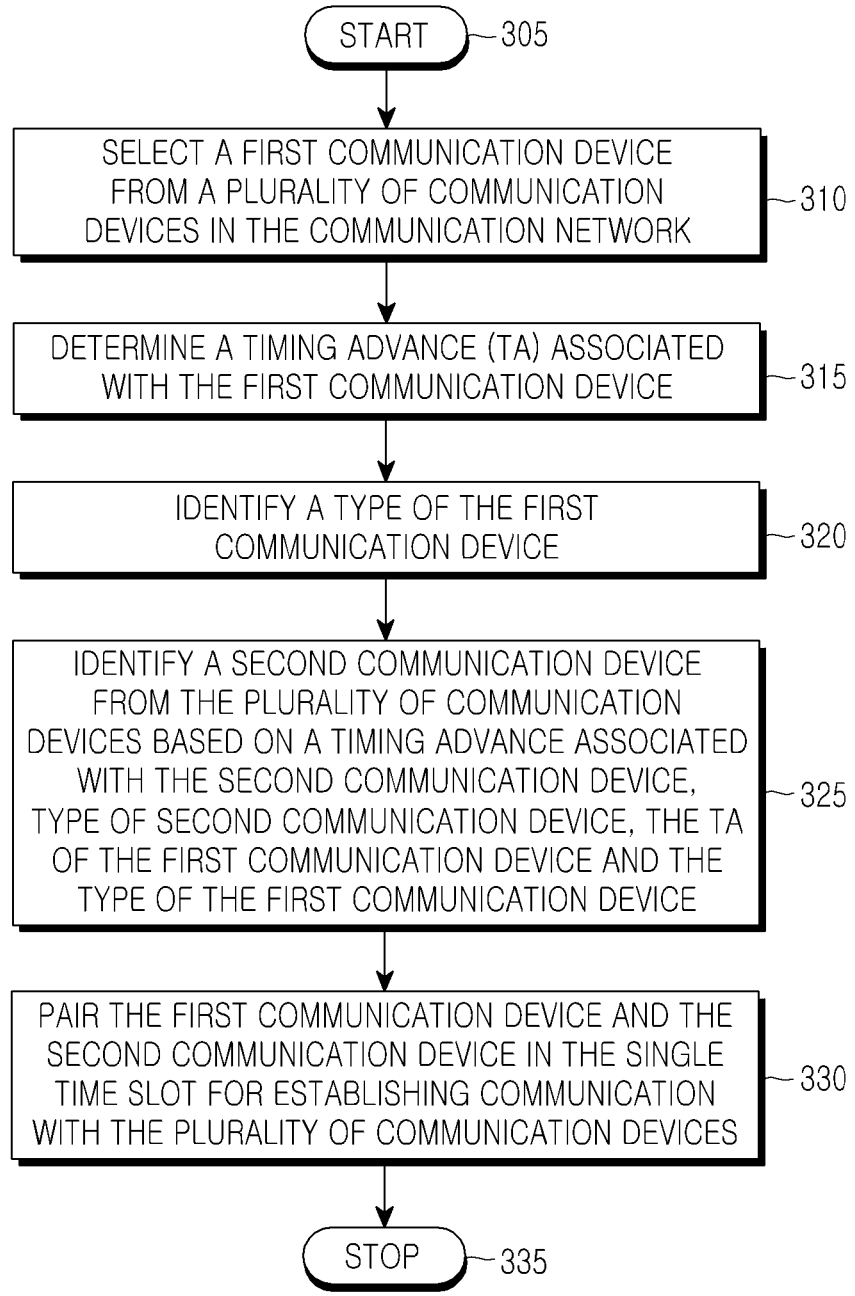
FIG. 3 illustrates a flowchart depicting a method for managing communication in a wireless communication network, in accordance with an exemplary embodiment of the present invention.

FIGS. 1 through 3, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present invention. Terms first, second, and the like are used to differentiate between objects having the same terminology and are no where intended to represent a chronological order, as and where stated otherwise. A set is defined as a non-empty set including at least one element.

FIG. 1 illustrates an exemplary environment, according to an exemplary embodiment of the present invention.

Referring to FIG. 1, the environment 100 includes a Base Transceiver Station (BTS) and a plurality of communication devices. The environment 100 includes a BTS 105, a communication device 110, and a communication device 115. While only one BTS and two communication devices are shown in the environment 100, it will be apparent to the person of ordinary skill in the art that the environment 100 may includes a different number of BTSs and a different number of communication devices.

The examples of the communication devices 110 and 115 include, but are not limited to, mobile phones, Personal Digital Assistants (PDAs), and Computers. For the sake of clarity and for the purpose of this description, each communication device 110 and 115 may also be referred as mobile device 110 and mobile device 115. However, it no where limits the scope of the invention to mobile device and hence the person of ordinary skill in the art can use any other communication device.

The plurality of communication devices are capable of communicating with each other through a communication network. The communication devices 110 and 115 may be capable of communicating with other communication devices through a wireless communication network. Examples of a wireless communication network include but are not limited to, Global System for Mobile communications (GSM), General Packet Radio Service (GPRS) and Code division multiple access (CDMA). The communication devices 110 and 115 may be capable of communicating with each other through GSM communication technology. The GSM communication uses a TDMA technique for enabling communication between communication devices.

The environment 100 also includes a plurality of Timing Advance (TA) regions. A region 135 represents a TA0, a region 140 represents TA1, and a region 145 represents TA2. Each communication device under a base station is associated with at least one TA. For example, in the environment 100, the communication device 110 is associated with TA0. The communication device 115 is associated with TA3. The TA is used to compensate for the propagation delay as the signal travels between the communication device (for example a Mobile Station (MS)) and a BTS. The BTS assigns the TA to the MS based on the distance of the MS from the BTS.

Each communication device may be associated a specific type. For example each communication device is associated with different receiving capabilities. For example, the mobile station may be a non-Downlink Advanced Receiver Performance (DARP) communication device, and a DARP communication device. The DARP communication devices involve advanced receiver algorithms such as an interference mitigation algorithm. The Non-DARP communication devices do not employ advanced receiver algorithms. The DARP and non DARP communication device may operate at different power levels.

The communication device 110 requests the BTS 105 for assigning a time slot. The BTS 105 assigns a time slot to the mobile device 110 for sending the data. For example, the BTS 105 assigns a first time slot, for example time slot one (TS1), in an uplink frame 120 to the mobile device 110 for establishing a first communication channel. In each of the uplink frame 120 the data from the mobile device 110 will be sent in the TS1. The BTS 105 assigns a time slot in the uplink frame to the mobile device for establishing the communication channel.

A single time slot may be assigned to more than one communication device for establishing a communication channel. This is performed when the Multiple Users Reusing One Single time slot (MUROS) concept is implemented for establishing a communication channel. The environment 100 may also implement the MUROS concept for enabling communication. However, the environment 100 pairs two communication devices based on the TA associated with each communication device and the type (receiving capabilities) of each communication device.

The BTS 105 pairs the two communication devices in a single time slot when the power imbalance ratio between the two devices is within a predefined threshold (for example within an acceptable level). Accordingly, the BTS 105 will assign the first time slot (TS1) to the mobile device 115, when the mobile device 115 requests the establishment of a second communication channel based on the TA of the mobile device 115 and the mobile device 110, and the type of the mobile device 115 and the mobile device 110. The BTS 105 may assign the first time slot (TS1) to the mobile device 115, if the power imbalance ratio of the mobile device 110 and the mobile device 115 is within the predefined range. The power imbalance ratio may be identified based on TA and the type of the mobile devices.

FIG. 2 illustrates a base transceiver station, in accordance with an exemplary embodiment of the present invention. To explain the communication device, references will be made to FIG. 1. However, it will be apparent to a person ordinarily skilled in the art that the present embodiment can be explained with the help of any other suitable embodiment of the present invention. The BTS 105 includes a processor 205 and a memory 210.

Referring to FIG. 2, the processor 205 in the BTS 105 is configured to select a first communication device from a plurality of communication devices in the communication network. In the environment 100, the processor 205 selects the mobile device 110. The processor 205 determines a TA associated with the first communication device. The processor 205 identifies TA0 for the mobile device 110. The processor 205 identifies a type of the first communication device. For example, the processor 205 may determine that the mobile device 110 is a non-DARP communication device or a DARP communication device.

The processor 205 identifies a second communication device from the plurality of communication devices for pairing with the first communication device (mobile device 110). The second communication device is selected based on a timing advance associated with the second communication device, type of the second communication device, the TA of the first communication device and the type of the first communication device. The second communication device may be selected based on the preference that the power imbalance ratio is within a predefined threshold.

The processor 205 pairs the first communication device and the second communication device in a first time slot for establishing communication. For example, the processor 205 pairs the mobile device 110 and the mobile device 115 in the first time slot (TS1). The BTS 105 may also include a memory 210. The memory 210 is configured to maintain a table including information about TA of the plurality of communication devices. For example, the memory 210 includes the TA of the mobile device 110 and the mobile device 115.

FIG. 3 illustrates a flowchart depicting a method for managing communication in a wireless communication network, in accordance with an exemplary embodiment of the present invention. To explain the method 300, references will be made to FIG. 1. However, it will be apparent to a person of ordinary skill in the art that the present embodiment can be explained with the help of any other suitable embodiment of the present invention. The method 300 can also include more or fewer number of steps as depicted in FIG. 3. Further, the order of the steps may also vary.

Referring to FIG. 3, at step 305, the method 300 is initiated. The method 300 may be implemented at the base transceiver station, for example the BTS 105. At step 310, the method selects a first communication device from a plurality of communication devices in the communication network. For example, a communication device 110 is selected. The first communication device may be selected when the first communication device initially requests the BTS 105 to establish a communication network with a communication device from the plurality of communication devices. The first communication device may be selected when the first communication device is already communicating with one or more communication devices using a second time slot.

At step 315, a TA associated with the first communication device is determined. For example, the TA of the communication device 110 TA0 is determined. At step 320, the method identifies a type of the first communication device. The type of the first communication device may be associated with receiving capabilities of the first communication device. The type of communication device may be a non-DARP communication device or a DARP communication device.

At step 325, the method 300 identifies a second communication device from the plurality of communication devices based on a timing advance associated with the second communication device, type of the second communication device, the TA of the first communication device and the type of the first communication device. The type of the second communication device may be associated with receiving capabilities of the second communication device.

The second communication device may be selected when the second communication device requests the BTS 105 to establish communication channel with a communication device from the plurality of communication devices. The second communication device may be selected when the second communication device is already communicating with one or more communication devices using a third time slot.

To reduce the co-channel interference and to increase the output level, a communication device that gives an acceptable power imbalance ratio may be selected. The power imbalance ratio may be dependent on the TA and the type of the communication device. The second communication device is selected when the TA associated with the second communication device is the same as the first communication device and the type of the second communication device is the same as the first communication device. As the TA and the type of the first communication device and the second communication device is the same, the power levels can be relatively better and thus the Bit Error Rate/Frame Error Rate (BER/FER) is less or within a predefined threshold (acceptable level).

The BTS continuously identifies those communication devices for pairing that gives the acceptable power imbalance ratio. Accordingly, when there are no communication devices that are of the same type and are in the same TA, then the BTS selects different criteria for selecting the communication device to bring the power imbalance ratio to the acceptable level.

The second communication device may be selected when the TA associated with the second communication device and the TA associated with the first communication device are different and the type of the first communication device and the second communication device are different. The second communication device may be selected based on the above mentioned criteria when there are no communication devices available that are of the same type of first communication device and also have the same TA.

The second communication device may be selected when the TA associated with the first communication device and the TA associated with the second communication device are the same and the type of the first communication device and the second communication device are different. The second communication device may be selected when the TA associated with the first communication device and the TA associated with the second communication device are different and the type of the first communication device and the second communication device are the same.

After selecting the second communication device, the BTS at step 330 pairs the first communication device and the second communication device in a first time slot for establishing communication with the plurality of communication devices. The first communication device and the second communication device, for example the communication device 110 and the communication device 115 are paired together in the time slot 1 (TS1) for communication.

The BTS may maintain a table that includes a TA of each of the plurality of communication devices that are associated with the BTS 105. The BTS may also maintain the acceptable power imbalance ratio associated with each communication device based on different types of communication devices. For example, when the BTS identifies that the first communication device is associated with TA0 and is of type DARP, then the BTS maintains a table that specifies the TA associated with the first communication device to identify the power level. Further, the BTS maintains in the table what should be acceptable power imbalance ratios when the other communication device is of the same or different types. At step 335 the method 300 terminates.

While the invention has been shown and described with reference to certain exemplary embodiments thereof, it will be understood by those skilled in the art that various changes in form and details may be made therein without departing from the spirit and scope of the present invention as described in the claims and their equivalents.

The invention claimed is:

1. A method for managing communication at a base transceiver station in a multi-user reusing one time slot (MUROS) based communication network including a plurality of communication devices, the method comprising:
    selecting a first communication device from the plurality of communication devices;
    determining a timing advance (TA) of the first communication device;
    identifying a type of the first communication device;
    selecting a second communication device to share a first time slot with the first communication device, from the plurality of communication devices based on a TA of the second communication device, a type of the second communication device, the TA of the first communication device, and the type of the first communication device; and
    assigning the first time slot to the first communication device and the second communication device when a power imbalance ratio between the first communication device and the second communication device is not greater than a predefined threshold,
    wherein the predefined threshold is based on the TA of the first communication device, the TA of the second communication device, the type of the first communication device, and the type of the second communication device, and
    wherein the type of at least one of the first or second communication devices is a downlink advanced receiver performance (DARP) communication device.

2. The method of claim 1, further comprising receiving a request from the first communication device and the second communication device to establish a communication network with one or more communication devices from the plurality of communication devices.

3. The method of claim 1, wherein the first communication device communicates with one or more communication devices using a second time slot and the second communication device communicates with one or more communication devices using a third time slot.

4. The method of claim 1, further comprising maintaining a table including a plurality of TAs,
    wherein each of the plurality of TAs is associated with at least one communication device of the plurality of communication devices in the communication network.

5. The method of claim 1, wherein the assigning of the first time slot to the first communication device and the second communication device comprises assigning the first time slot to the first communication device and the second communication device when:
    the TA of the first communication device and the TA of the second communication device are the same and the type of the first communication device and the second communication device are the same.

6. The method of claim 1, wherein the assigning of the first time slot to the first communication device and the second communication device comprises assigning the first time slot to the first communication device and the second communication device when:
    the TA of the first communication device and the TA of the second communication device are different and the type of the first communication device and the second communication device are different.

7. The method of claim 1, wherein the assigning of the first time slot to the first communication device and the second communication device comprises assigning the first time slot to the first communication device and the second communication device when:
- the TA of the first communication device and the TA of the second communication device are the same; and
- the type of the first communication device and the second communication device are different.

8. The method of claim 1, wherein the assigning of the first time slot to the first communication device and the second communication device comprises assigning the first time slot to the first communication device and the second communication device when:
- the TA of the first communication device and the TA of the second communication device are different; and
- the type of the first communication device and the second communication device are the same.

9. A base transceiver station comprising:
at least one processor configured to:
- select a first communication device from a plurality of communication devices,
- determine a timing advance (TA) of the first communication device,
- identify a type of the first communication device,
- select a second communication device to share a first time slot with the first communication device, from the plurality of communication devices based on a TA of the second communication device, a type of the second communication device, the TA of the first communication device and the type of the first communication device, and
- assign the first time slot to the first communication device and the second communication device when a power imbalance ratio between the first communication device and the second communication device is not greater than a predefined threshold; and a memory configured to maintain a table including information about TAs of the plurality of communication devices, wherein the predefined threshold is based on the TA of the first communication device, the TA of the second communication device, the type of the first communication device, and the type of the second communication device, and wherein the type of at least one of the first or second communication devices is a downlink advanced receiver performance (DARP) communication device.

* * * * *